United States Patent [19]

McDonald et al.

[11] 4,271,579
[45] Jun. 9, 1981

[54] PAINT ROLLER CAGE ASSEMBLY APPARATUS AND METHOD

[75] Inventors: Walter McDonald, Landing; Norbert J. Seitel, Gillette, both of N.J.

[73] Assignee: Charles E. Green & Son, Inc., Newark, N.J.

[21] Appl. No.: 39,795

[22] Filed: May 17, 1979

Related U.S. Application Data

[62] Division of Ser. No. 874,524, Feb. 2, 1978, Pat. No. 4,170,289.

[51] Int. Cl.³ .................. B23P 19/00; B23P 21/00
[52] U.S. Cl. ............................ 29/430; 29/172; 29/281.1
[58] Field of Search .............. 29/281.1, 559, 429, 29/430, 785, 792; 15/230.1, 230.13; 198/653, 693, 695; 219/79; 156/499

[56] References Cited

U.S. PATENT DOCUMENTS

| | | | |
|---|---|---|---|
| 2,092,786 | 9/1937 | Taylor | 29/785 UX |
| 2,110,494 | 3/1938 | Zimmerman | 15/230.1 |
| 2,640,617 | 6/1953 | Spicer | 29/785 UX |
| 2,642,706 | 6/1953 | Davies | 15/230.13 |
| 2,834,394 | 5/1958 | Sharn et al. | 156/499 |
| 2,995,810 | 8/1961 | Wilson | 29/430 UX |
| 3,112,562 | 12/1963 | Wilson | 29/430 |
| 3,190,462 | 6/1965 | Gartner | 198/653 X |
| 3,258,807 | 7/1966 | Jeske | 15/230.13 |
| 3,317,702 | 5/1967 | Mann | 219/79 |
| 3,608,744 | 9/1971 | Ward et al. | 29/430 X |
| 3,793,706 | 2/1974 | Dohlen et al. | 29/559 |
| 3,955,667 | 5/1976 | Muller et al. | 198/693 X |

*Primary Examiner*—Charlie T. Moon
*Attorney, Agent, or Firm*—Norman N. Popper; Daniel H. Bobis

[57] ABSTRACT

A paint roller cage assembly apparatus in which a group of four cage wires are held and affirmatively positioned generally as if at the corners of a square; a cage wire cap with sockets for the cage wires is then applied to one end of the cage wires, and a similar cage wire cap is next applied to the other end of the cage wires, thereby automatically assembling a paint roller cage; the apparatus includes cage wire feeders, and a plurality of cage wire holders in the form of pivotably associated links which may be pivoted to position the wires for the application of the caps.

10 Claims, 22 Drawing Figures

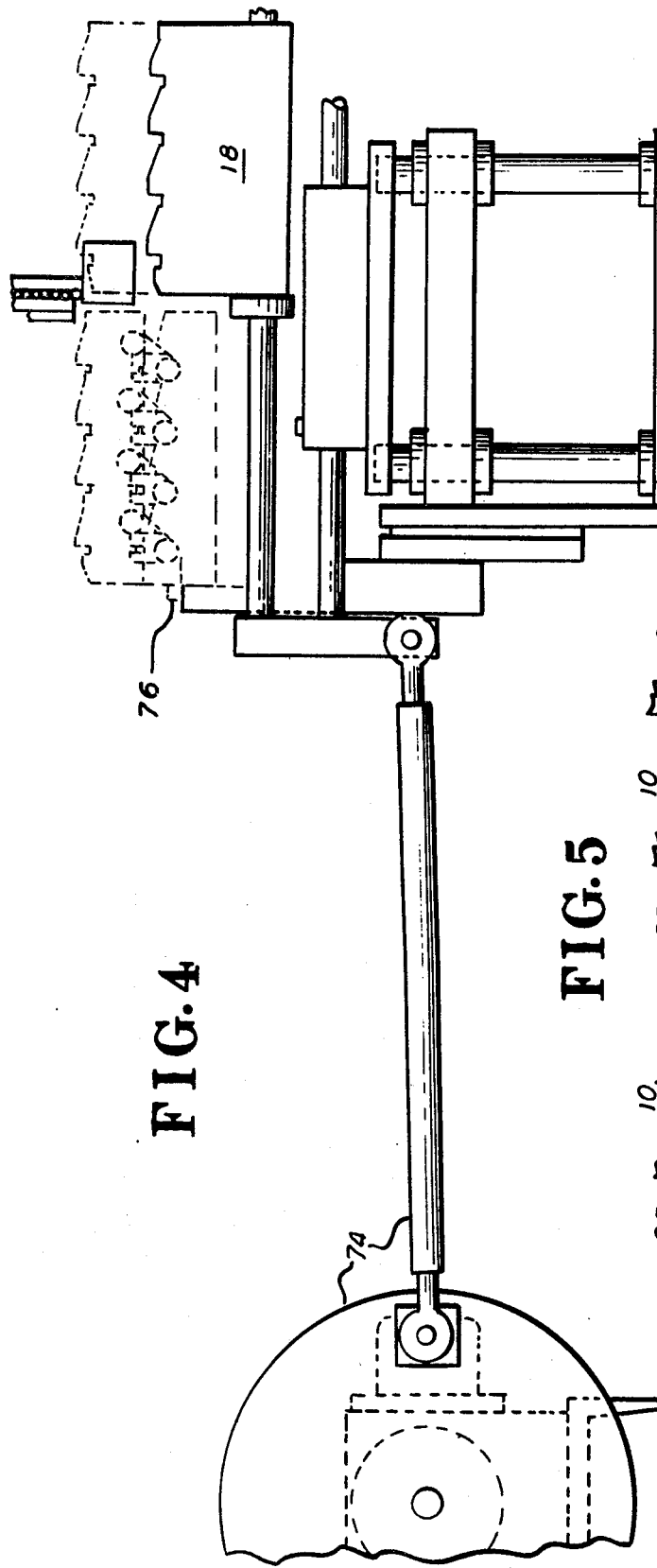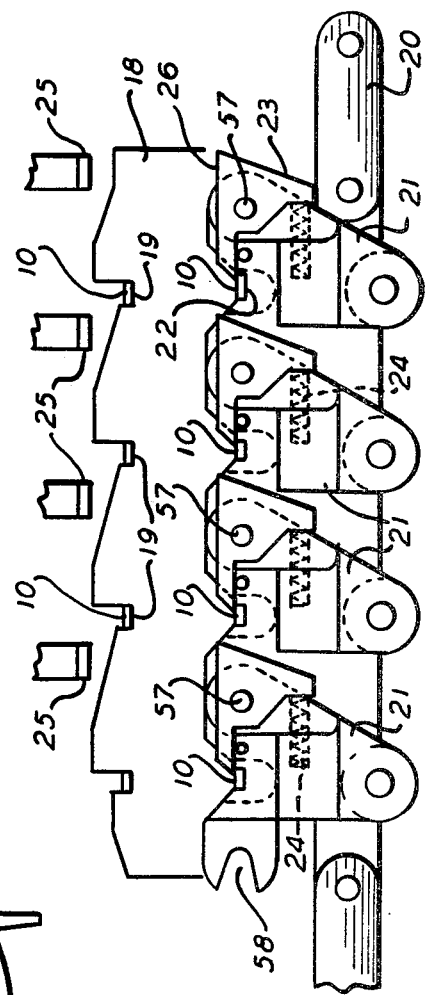

FIG. 8
FIG. 9
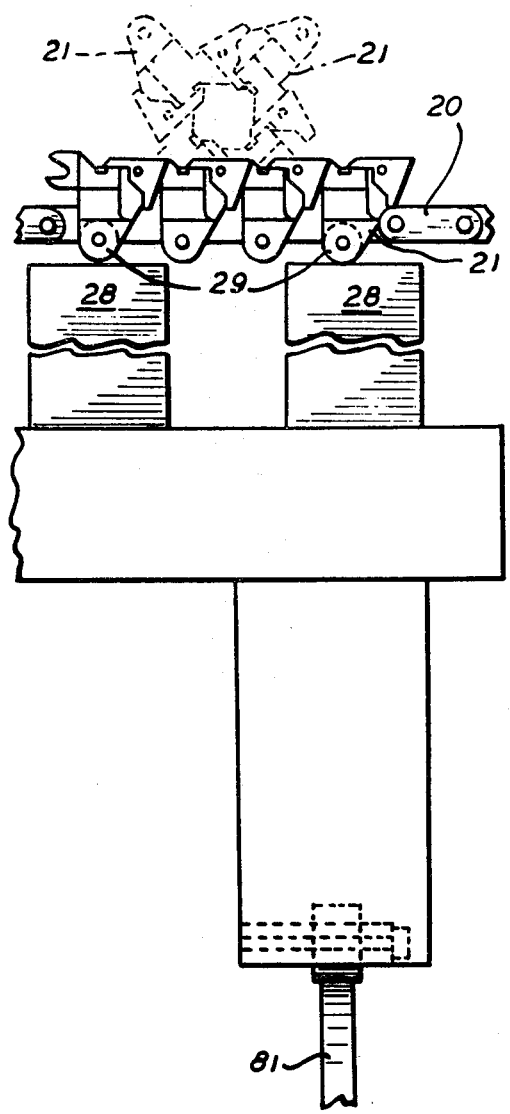
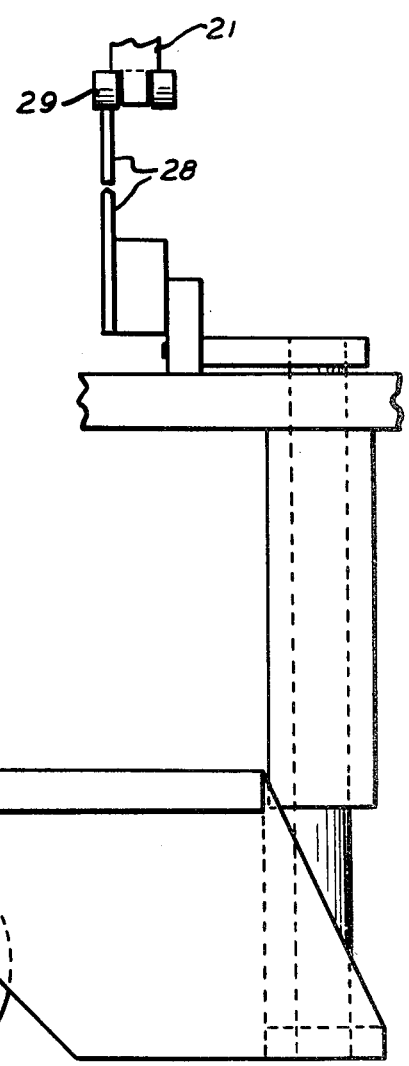

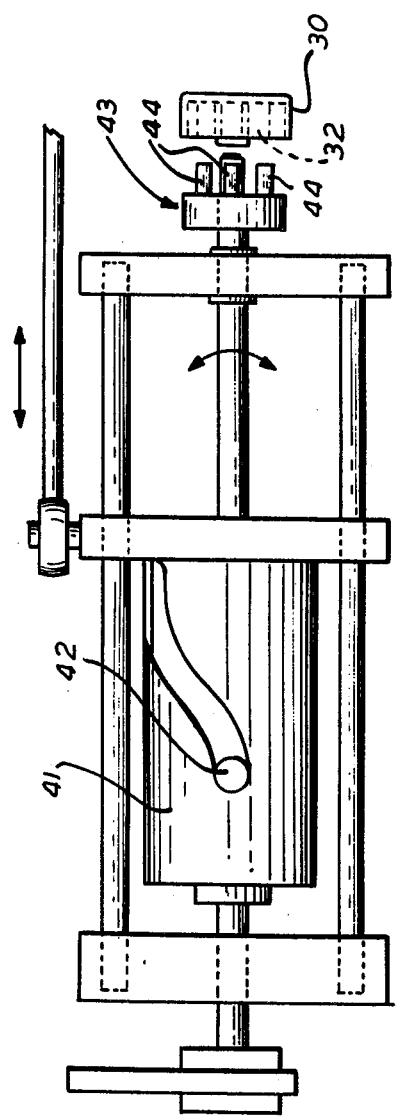
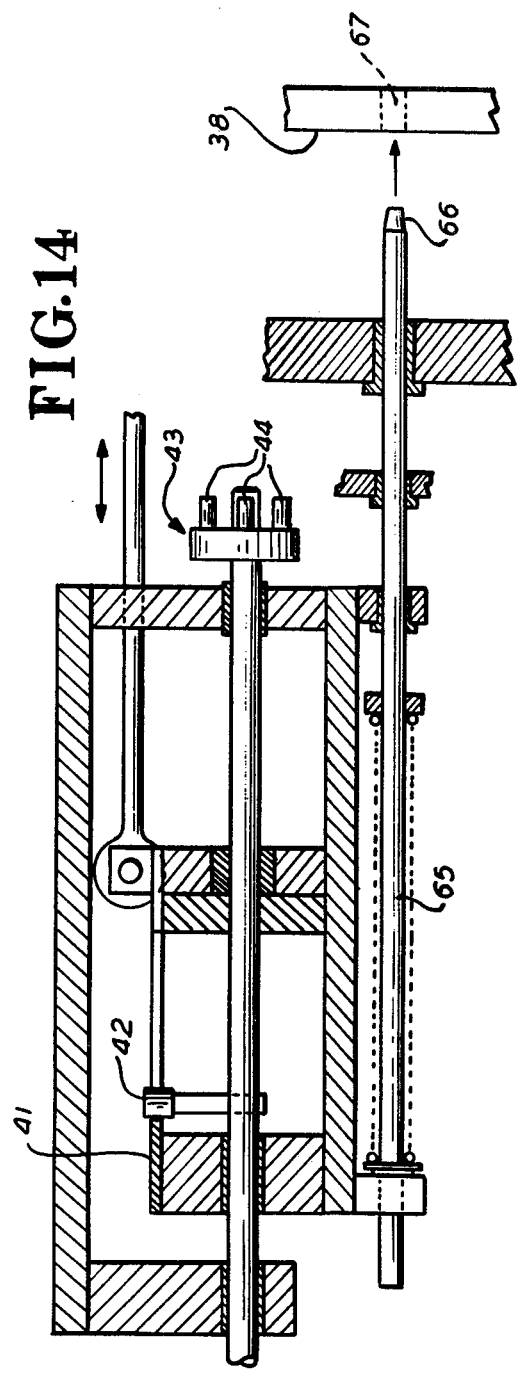

PAINT ROLLER CAGE ASSEMBLY APPARATUS AND METHOD

This is a division of application Ser. No. 874,524 filed Feb. 2, 1978, now U.S. Pat. No. 4,170,289 issued Oct. 9, 1979.

BACKGROUND OF THE INVENTION

1. Field of Invention

This invention relates generally to apparatus for assembling paint roller cages and particularly to an apparatus for automatically assembling paint roller cages by positioning the cage wires and end caps for automatic assembly with each other.

2. Prior Art

Numerous automatic machines have been devised for accomplishing specific purposes. Each machine is especially adapted to deal with particular components which are to be assembled. Davies U.S. Pat. No. 2,642,706 discloses an apparatus for assembling a buffing wheel. Sharn, U.S. Pat. No. 2,834,394 discloses an apparatus including a chain conveyor wherein washers are deposited on the conveyor and are bonded together under heat. Jeske, U.S. Pat. No. 3,258,807 is another example of an assembly device. Mann, U.S. Pat. No. 3,317,702 discloses an apparatus for assembling and securing together numerous work pieces by a welding operation. There is no known apparatus for assembling paint roller cages. The conventional method of assembling them is by hand and involves the placing of cage wires manually and individually in corresponding holes in end caps at both ends of the cage wires, and pressing the ends of wires home in the sockets in the end caps. This operation is time consuming and involves very substantial labor costs in the production of paint roller cages.

SUMMARY OF INVENTION

It has been found that a paint roller cage assembly apparatus can be devised which automatically performs a series of functions:

a. random groups of cage wires are deposited on a feeder for the cage wires.

b. The cage wires are delivered from the feeder upon which they are individually oriented for delivery to a cage wire stack feeder.

c. The cage wire stack feeder delivers the cage wires to a shuttle which is a cage wire holder for a group of four cage wires.

d. The cage wire shuttle then delivers the cage wires to a transfer station where they are deposited upon a plurality of pivotably interconnected links mounted opposite each other on endless conveyors, to which they are affirmatively latched in place.

e. The link means initially holds the wires linearly with respect to each other, and then folds up to convey the wires to a first cage wire assembly station where the link means is pivoted to dispose the four cage wires (there could be more or less) held on the link means in positions defining the corners of a square (or other chosen shape) exactly opposite to holes in cage wire end caps; means is provided to maintain the link means in folded position until the paint roller cage is capped at both ends.

f. At this first assembly station, caps are delivered to a position opposite the cage wires by a rotating turret and the caps are reoriented into registration with the cage wires.

g. The caps are then pressed onto the cage wires at one end and the conveyor then transports the group of cage wires to a second assembly station, where a cap is applied to the opposite ends of the cage wires in a similar manner.

h. Thereafter the pivotable links release the capped cage wires at a third station and the caps are driven into complete seating engagement with the cage wires. The conveyor then proceeds to deliver the assembled paint roller cage assembly to a discharge station.

By this means, paint roller cages are automatically and completely assembled with great rapidity without manual intervention into the assembly process, thereby affecting great economies in production.

DRAWINGS

These objects and advantages as well as other objects and advantages may be achieved by the device shown by way of illustration in the drawings in which.

Figure 1:
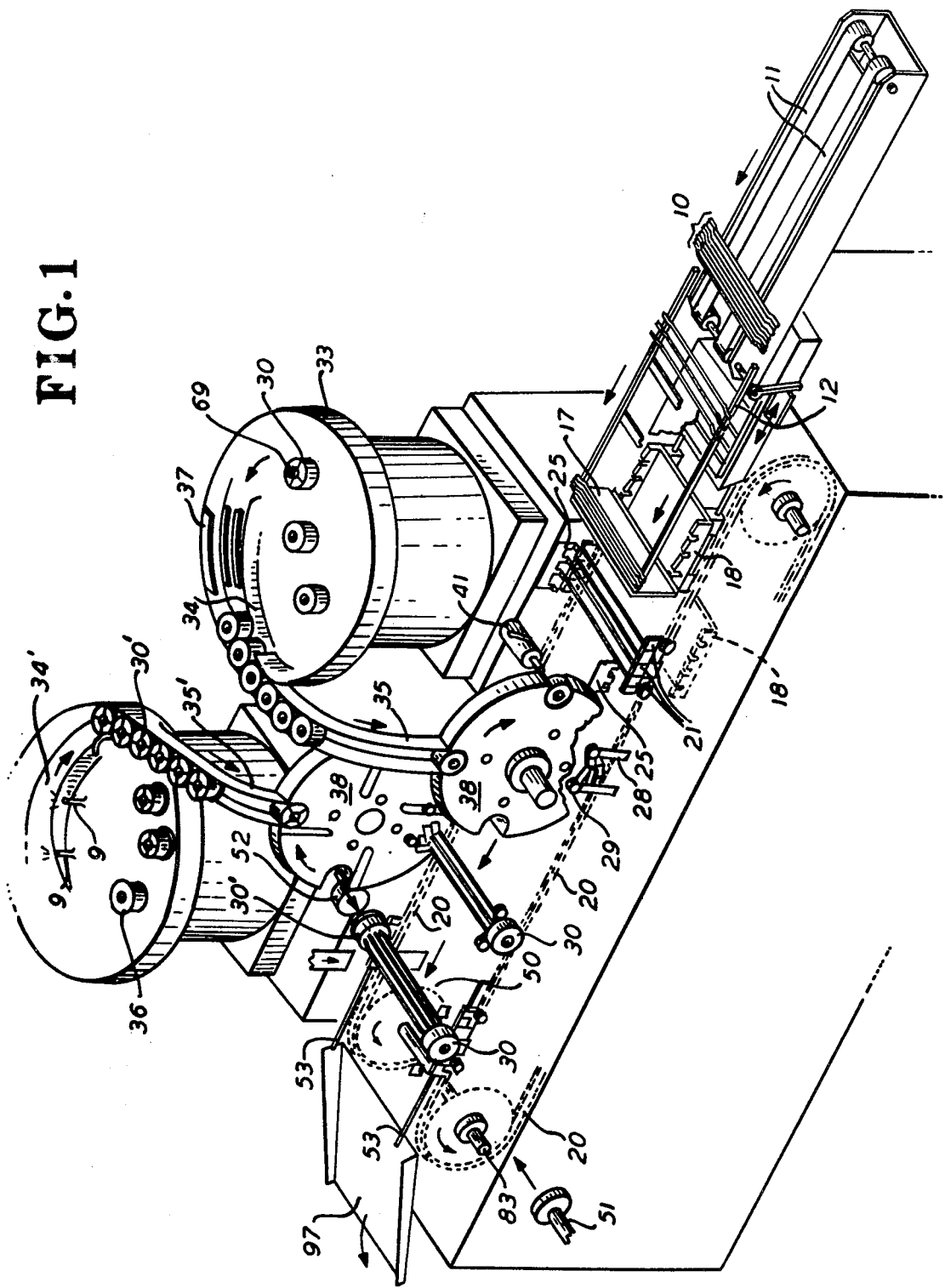
FIG. 1 is a perspective view of the apparatus
Figure 2:
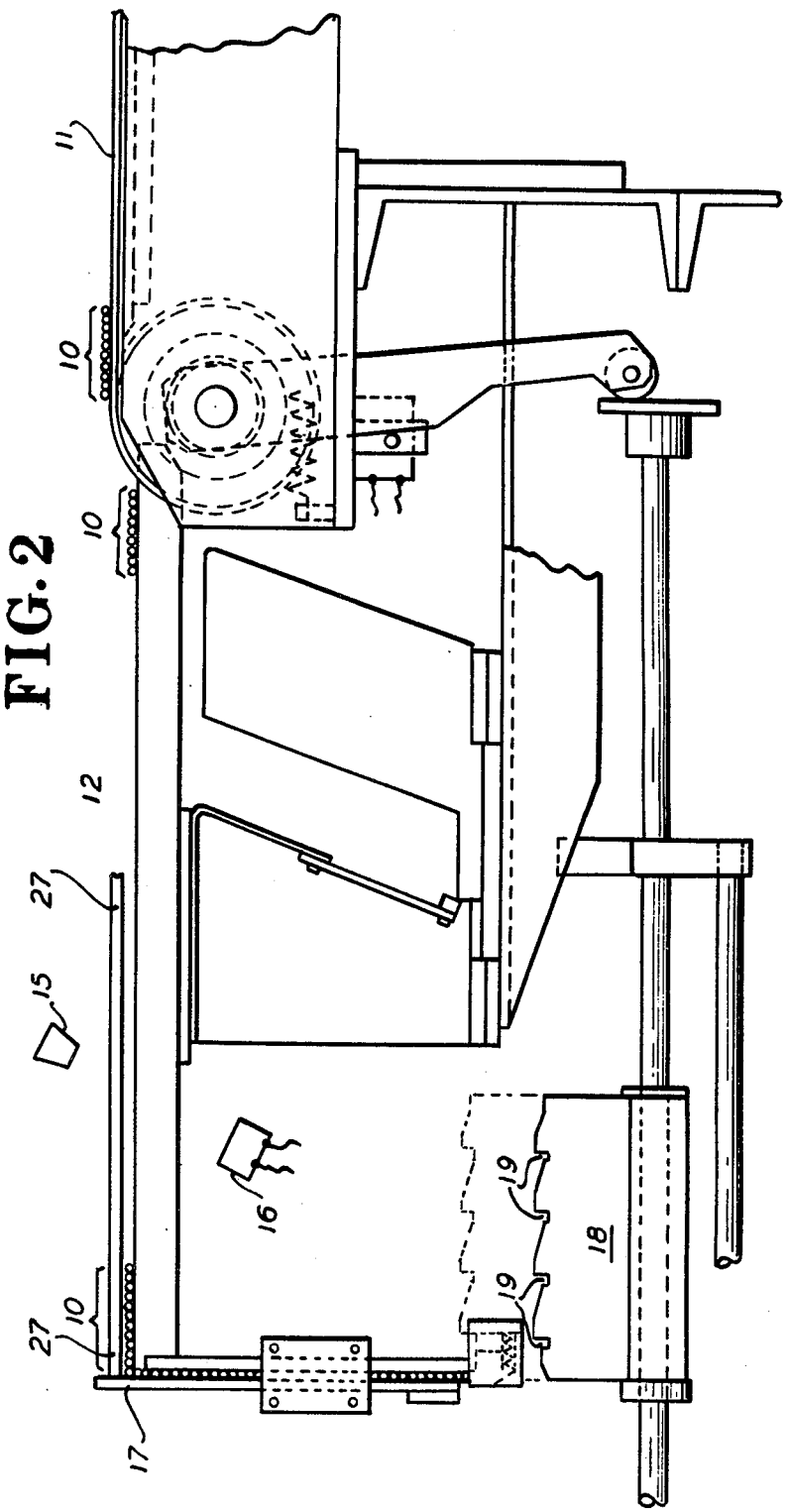
FIG. 2 is a side elevational view of the wire delivery means, the wire feeder means, the stack feeder, and the shuttle
Figure 3:
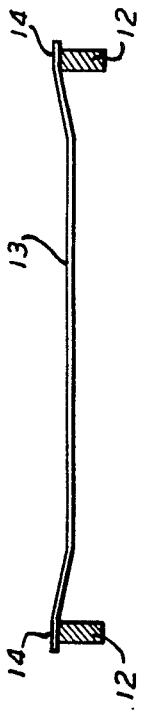
FIG. 3 is a view of a cage wire oriented with the bellied side down in the wire feeder means (vibrating tracks)
Figure 6:
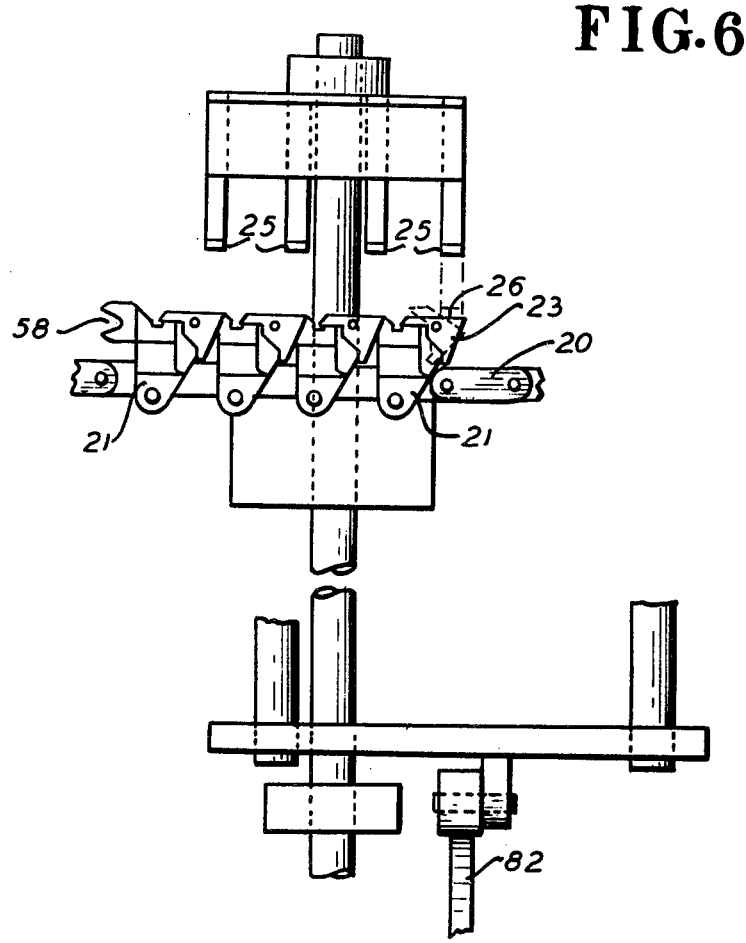
Figure 7:
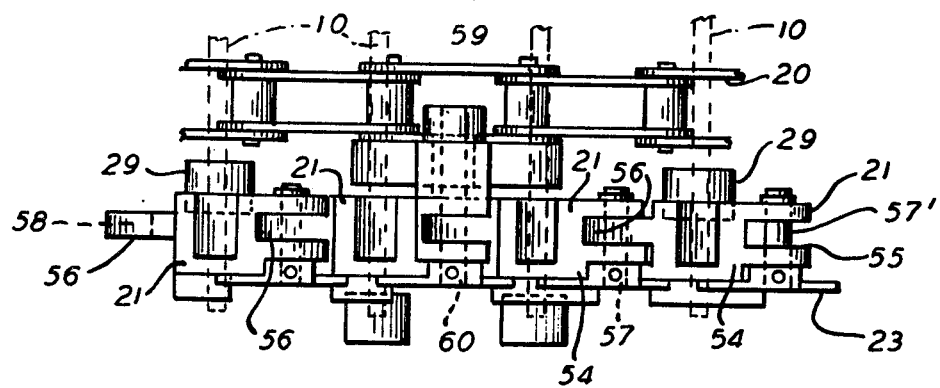
Figure 10:
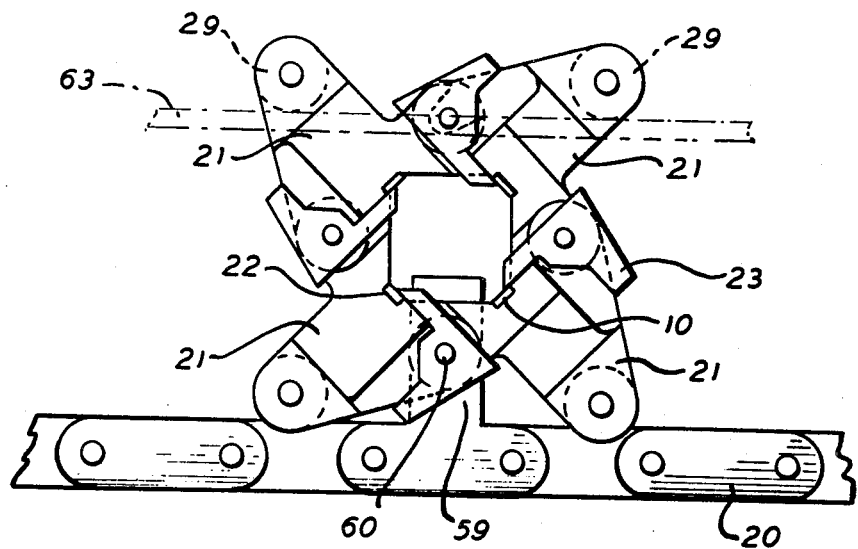
Figure 11:
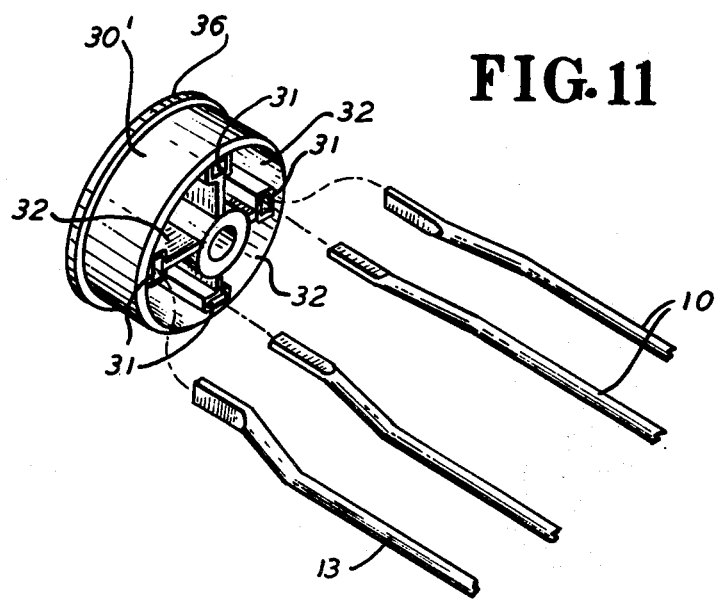
Figure 12:
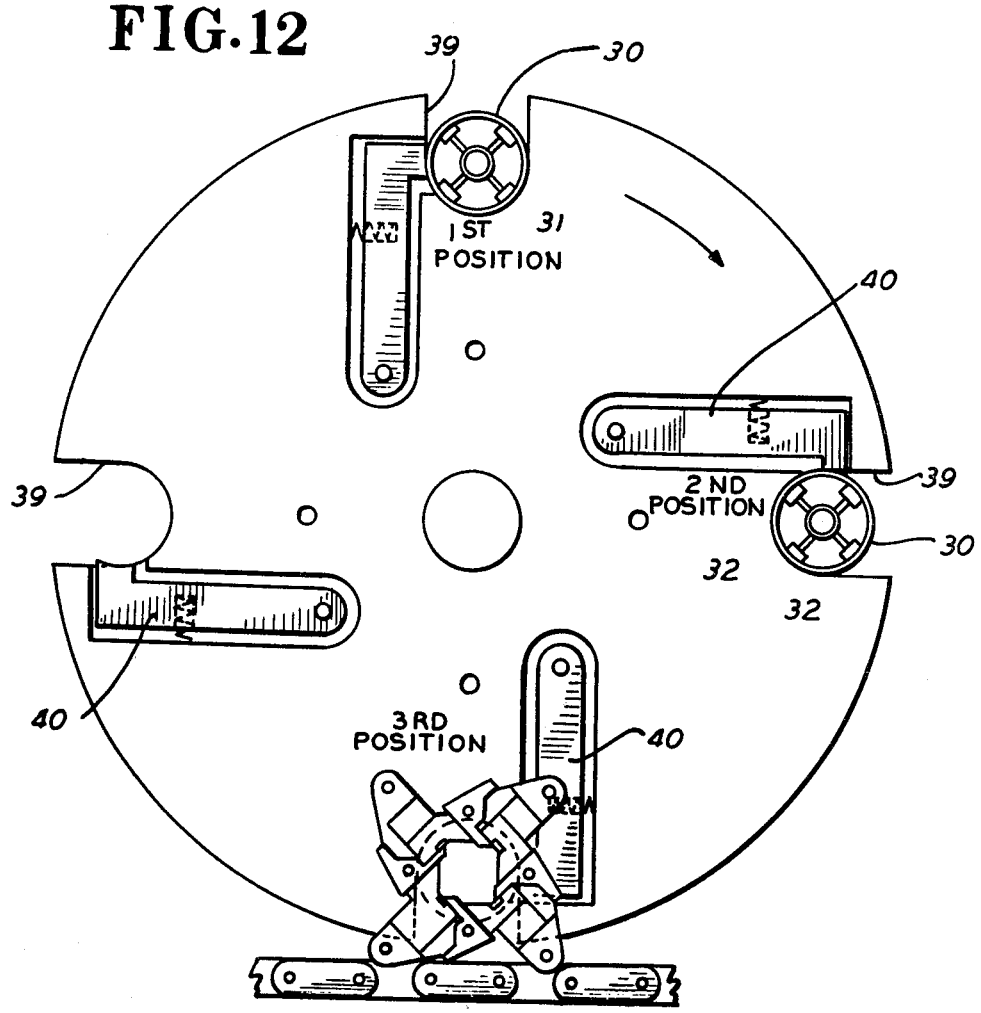

FIG. 4 is a side elevational view of the reciprocating shuttle drives, and the links with cage wires FIG. 5 is a side elevational view showing the details of the links, and the latches and latch releases FIG. 6 is a side elevational view of the latch release drive and the latches and links FIG. 7 is a top view of one endless conveyor and the links mounted thereon with four received cage wires FIG. 8 is a side elevational view of the links disposed linearly, and the dotted lines show the links folded to position the cage wires for the application of the end caps; the fingers for folding the links are shown;

FIG. 9 is an end view of the fingers engaged with cam followers on the links to fold the links; the drive for the fingers is shown FIG. 10 is a detailed side elevational view of the links in folded position as shown by the dotted lines in FIG. 8;

FIG. 11 is a view of the cage wires in exploded position, showing how they will be oriented to receive the end caps; (the broken lines show the ultimate position of the cage wires to receive the caps;

FIG. 12 is a view of the rotatable cap turret, showing at the top, the cap receiving station, the cap orientation station (90°), and the first cap application station (180°)

Figure 19:
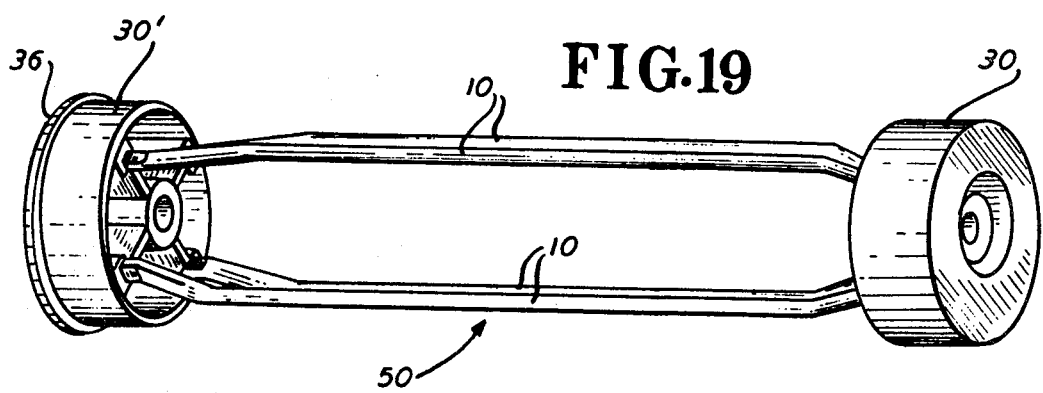
Figures 15, 16:
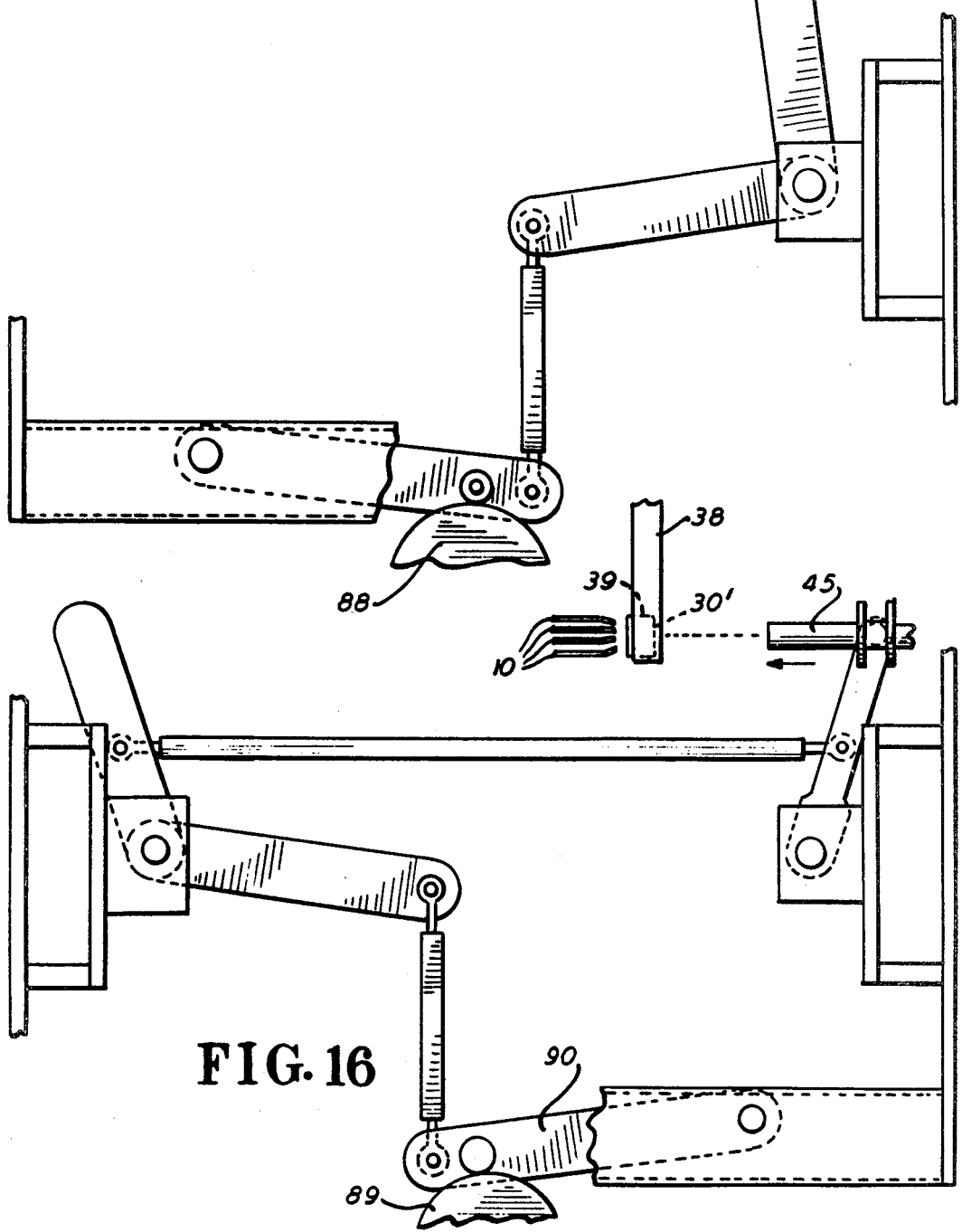
Figure 17:
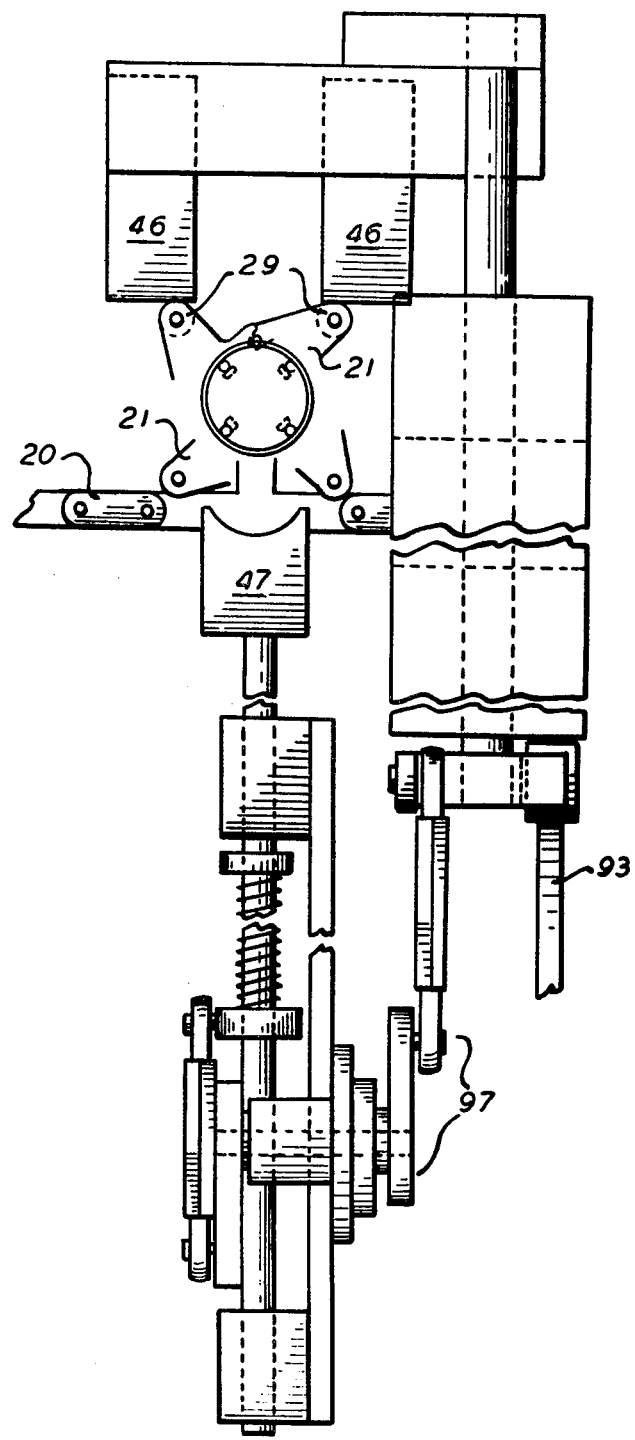
Figure 17A:
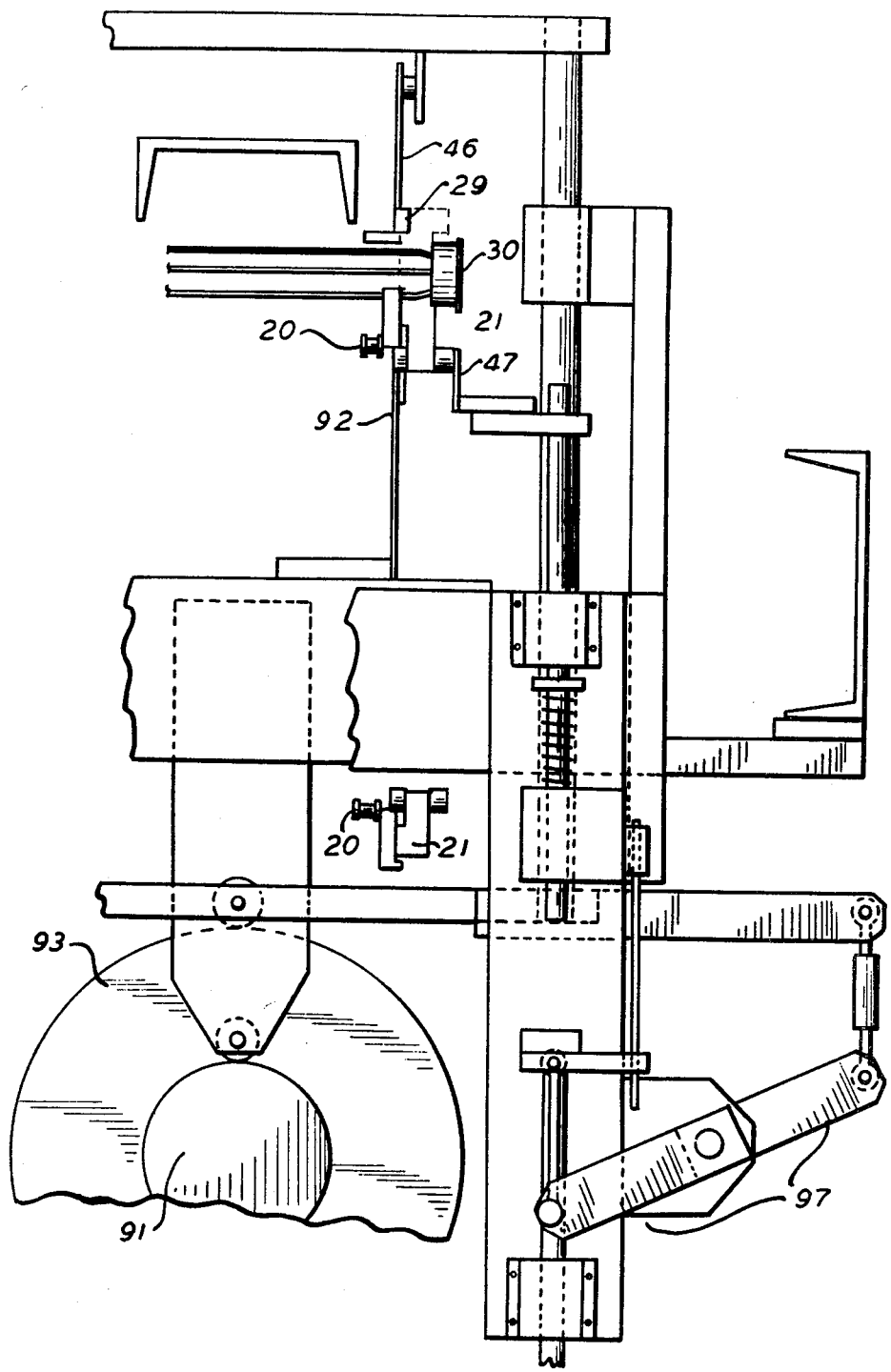
Figure 18:
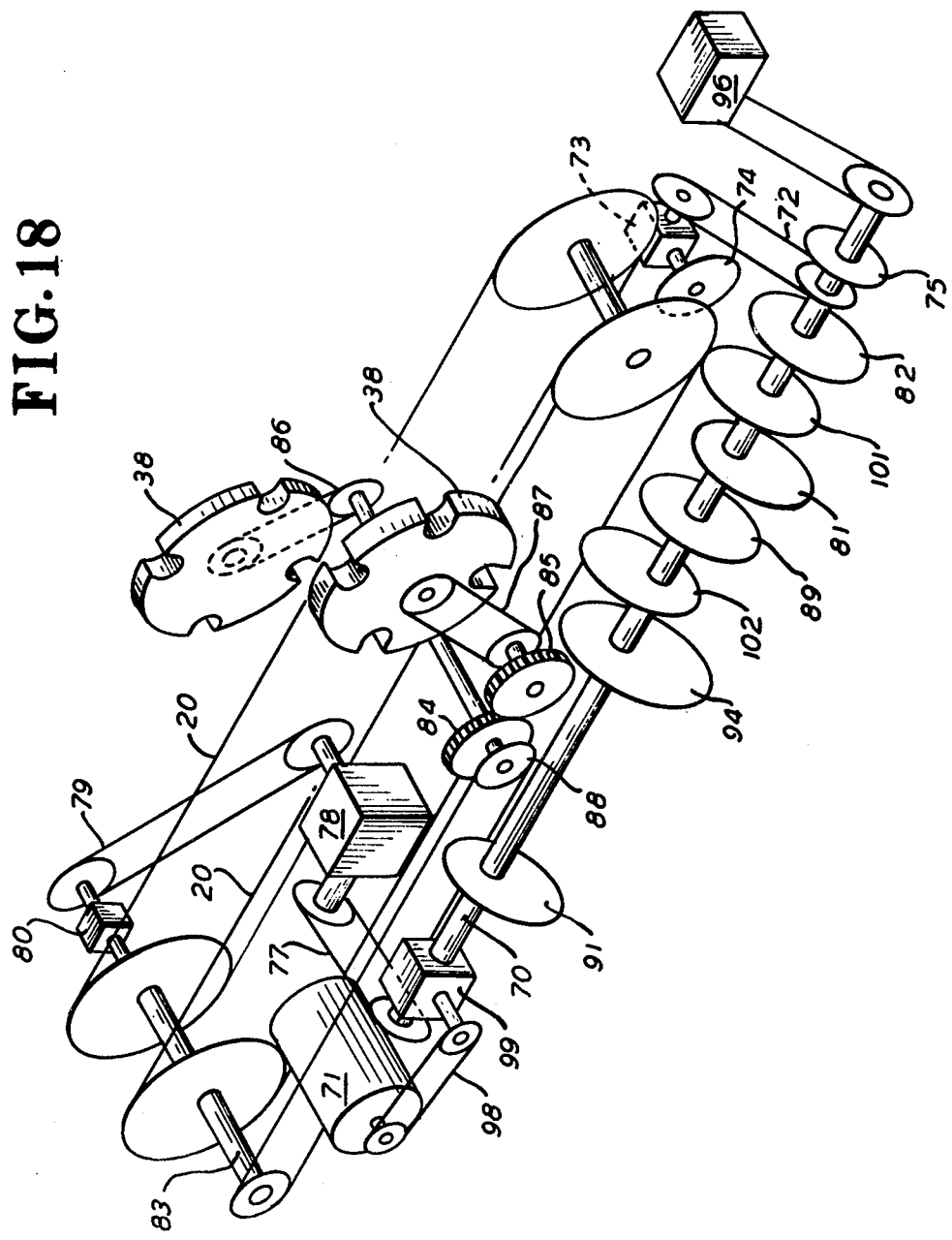
Figure 21:
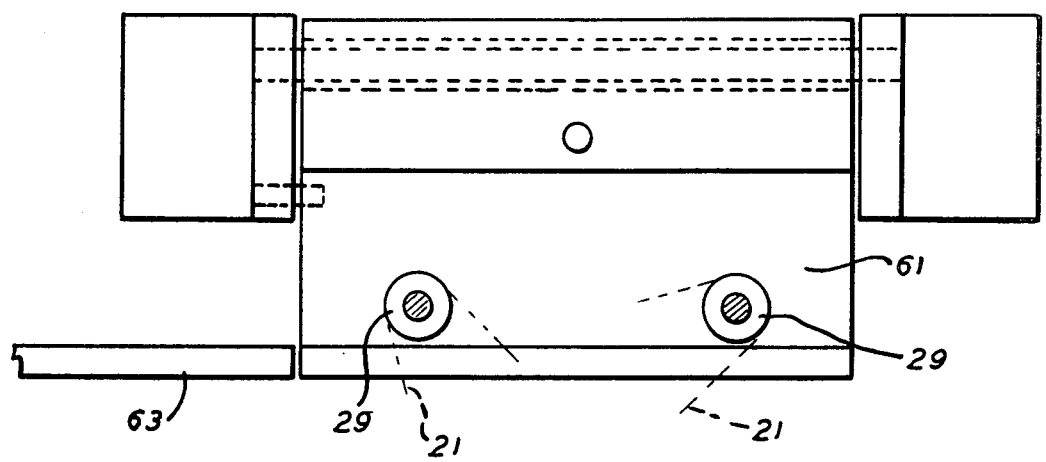
Figure 20:
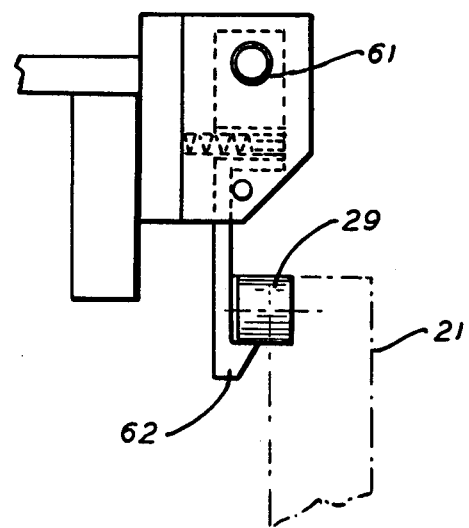

FIG. 13 is a side elevation of the barrel cam and cap twister approaching a cap;

FIG. 14 is a partial vertical sectional view of the barrel cam and cam follower which drives the cap twister; and the shot pinning device for stabilizing the turret;

FIG. 15 is a view of the drive for reciprocating the barrel cam shown in FIG. 14;

FIG. 16 is a side elevational view of the rod for discharging the cap from the turret into engagement with the ends of the cage wires;

FIG. 17 is a side elevational view of the descending fingers which engage the cam follower on the links and unfold the links to release the cage roller assembly which is received by rising lifters;

FIG. 17A is a view of lifter for holding the paint roller cage assembly free of the link members;

FIG. 18 is a diagrammatic view of the main drive and its operative connections to all of the operating components;

FIG. 19 is a perspective view of the final paint roller cage assembly;

FIG. 20 is an end elevational view showing the spring loaded plate supporting the cam followers;

FIG. 21 shows a support track, and a side elevational view of the plate that supports the cam followers.

PREFERRED EMBODIMENT

A hopper (not shown) delivers random groups of cage wires 10 to a pair of feed belts 11 which operate as conveyors only on demand. The feed belts 11 deliver the cage wires 10 to vibrating tracks 12. The cage wires 10 are not straight but have an intermediate offset portion 13 extending between the ends 14, 14. As the cage wires 10 are delivered to the vibrating tracks 12 by the belts 11, the vibration causes them to jiggle and assume a position where the offset central portion 13 or bellied portion is faced downwardly on the tracks 12. Light from a lamp 15 is directed at the normal course of cage wires 10 on the tracks 12 toward an electric eye 16. When the cage wires 10 are nearly exhausted, the light from the lamp 15 falls on the electric eye 16 and closes a circuit to the drive for the belts 11 which causes the delivery of more cage wires 10 to the vibrating tracks 12. The vibrating tracks 12 jiggle the wires 10 to a vertical stack feeder 17 into which they fall with the offset portion 13 disposed downwardly. Under the vertically disposed cage wire stack feeder 17, there is a shuttle 18 having corresponding indentations 19 for cage wires 10. There are four indentations 19 in each side of the shuttle 18. The shuttle moves beneath the stack 17, in close relation thereto, so that each time an indentation 19 on the shuttle 18 passes opposite the wires 10 in the stack feeder 17, a cage wire 10 will fall into the indentations 19. Thus four cage wires 10 are picked off from the cage wire stack feeder 17 and deposited in the indentations 19. The shuttle 18 moves on a generally rectangular course, first horizontally to pick off four cage wires 10, then downwardly, then backwards, and finally upwardly to its starting position where the cycle of picking off four cage wires is repeated.

Beneath the shuttle 18 and on either side of it, there is a pair of endless chains 20. A group of four pivotably interconnected link members 21 are attached to each of the endless chains 20 opposite each other so that each group of pivotably interconnected link members 21 moves in concert with the opposite link members 21 on the other of the pair of endless chains 20. In each group of link members 21, there are four links 21 pivotably connected together and one of the links is attached to each of the endless chains 20.

Each of the link members 21 which will be more particularly described subsequently, is provided with a cage wire seat 22. The shuttle 18 moves horizontally, and then downwardly in timed relationship to the movement of the link members 21, and between the link members 21. In so doing, the ends of each of the cage wires 10 encounter the cage wires seats 22 on each of the link members 21 and four cage wires 10 are transferred from the downwardly moving shuttle 18 to the cage wire seats 22 on the link members 21. This occurs at a transfer station. Each of the cage wire seats 22 on the link members 21 is provided with a spring 24 loaded latch 23. As the link members 21 approach the transfer station, fingers 25 descend and engage an extension 26 on the latches 23, overcoming the springs 24 and opening up the latches 23 so that the cage wires 10 may enter the seats 22. When the transfer of cage wires from the shuttle 18 to the link members 21 is completed, the fingers 25 ascend and release the latches 23.

The springs 24 on the latches 23 are no longer overcome and the latches 23 affirmatively engage the cage wires 10 in the seats 22. In order to ensure that the cage wires 10 are properly oriented on the stack feeder 17 before they are delivered to the stack feeder 17 a doctor bar 27 is disposed above the stack feeder 17. Any cage wires 10 which are not properly oriented with the bellied section downwardly, encounter this doctor bar 27 and are caused to turn until the bellied section 13 is disposed downwardly. In this manner, all wires delivered to the link members 21 are properly oriented.

When the transfer of cage wires 10 at the transfer station is completed and the cage wires 10 are all properly oriented to the link members 21, the endless chain 20 for the link members 21 resumes its motion to a cage wire reorientation station. At the cage wire reorientation station, the endless chain 20 again ceases its forward motion, and in timed relation, a pair of fingers 28, along side of the link members 21 rise and encounters cam followers 29 on the end link members 21, driving the end link members 21 upwardly to folded condition (see FIGS. 8 & 10) until the opposite ends of the link members 21 are disposed engaged with each other. In this position, the cage wires 20 will be disposed delineating with each other a square, and are positioned to receive end caps 30. Once the fingers 28 have engaged the cam followers 29 and have folded the link members 21 completely, they will encounter a spring loaded plate 61 which has a lip 62. The plate is thrust aside by the cam followers 29, and the plate 61 springs back into detaining position, with the lip supporting the cam followers 29 so that the links 21 cannot unfold. The fingers 28 are no longer needed to support the links 21 in folded position and they return to their original position. The forward movement of the endless chains 20 carries the cam followers 29 off the supporting lip 62, into a fixed support track 63 so that the links cannot unfold until after both caps 30, 30' have been applied. In this manner, the links 21 remain in folded position for both caps to be applied until the cam followers 29 ride off the supporting tracks 63. It will be noted that the end caps 30 are devised with four sockets 31 for receiving the cage wires 10 and spaces or pockets 32 in between the four sockets 31 which spaces are useful for the purpose of orienting the end caps so that the sockets 31 will be in precise registration with the cage wires 10 as disposed on the link members 21. The cage wires 10, being held symmetrically disposed, are ready for the application of the end caps 30 at the reorientation station which also is the station at which a first end cap is applied. Above this first end cap application station, there is a vibrating tray 33. At this first end cap application station, end caps 30 are deposited in a vibrating tray 33. End caps 30 without a flange are deposited in this vibrating tray 33 and march along a track 34 toward a vertical cap column 35. Since the caps here are not flanged, but have a hub 69, there is provided a guide plate 37 which obstructs the raised hub 69 on the cap 30 and prevents it from entering the vertical column 35 with the hub 69 up because the guide plate won't let it pass. Only properly oriented caps 30 enter a vertical cap feed column 35 where they are delivered to a circular cap turret 38 having four diametrically disposed, equal distanced cap sockets 39 facing toward the ends of the cage wires 10. Each cap socket 39 is provided with a cap-detent 40 which hold the cap in the cap socket 39. Thus a cap 30 is deposited in the cap socket 39 in the cap turret 38. The cap turret 38 then revolves 90°. The cap turret 38 stops after the 90 degree rotation, and at this point, a barrel cam 41 rotates, and a cam follower 42 projects a four pronged cap twister 43 into engagement with pockets 32 in the caps 30 between the cage wire sockets 31. Operating concurrently with cap twister 43, there is a shot pinner 65, which is a rod, the end 66 of which enters a socket 67 in the turret 38 to fix the position of the turret 38 accurately for the cage wire sockets 31 to receive the ends of the cage wires 10. Prongs 44 twist the cap 30 in the cap turret socket 39, and then the barrel cam 41 reverses, and the prongs 44 position the cap 30 properly so that the cap cage wire sockets 31 will be exactly opposite the ends of the cage wires 10 when the cap turret 38 revolves another 90°. The barrel cam 41 disengages the cap twister 43 from the cap 30 and the cap turret 38 revolves another 90°, where the application of the cap 30 to the cage wires 10 is performed. It will be noted that the twister 43 has properly positioned the cap 30 in registration with the cage wires 10 on the link members 21. In timed relation to the cap turret 38 carrying the cap 30 to this third position, a rod 45 operates to propel the cap 30 toward the ends of the four cage wires 10 and out of the cap socket 39 in the cap turret 38. The cage wires 10, being properly oriented on the link members 21, enter the cage wire sockets 31 in the caps 30, as the link members 21 resume their forward motion, and the cap 30 is carried from and disengaged from the cap turret 38. Each cage wire 10 is in its particular socket 31 in the cap 30, and the bellied portion 13 extends radially outwardly from the cap 30. Having applied a cap 30 to one end of the cage wires 10, the endless chain 20 continues its movement until the link members 21 arrives at a second cap reorientation and applying station. Here again, a second cap feeding means 35', revolving cap turret 38, cap reorientation means 43, and cap application rod 45 function to apply a second cap 30' to the opposite end of the cage wires 10 leaving caps 30', 30 applied to both ends of the cage wires 10. End caps 30' are deposited in this vibrating tray 33 and march along a track 34' toward a vertical cap feed column 35'. These caps 30', unlike the caps 30 in the first turret, are provided with flanges 36; a pair of air jets 9 intersect the path of the caps. If these caps 30' have their sockets downward, the jets 9 flip them off the track; if the caps 30' have their planar face downward, the jets 9 allowing them to jiggle onto the track 34'; only caps 30' with their sockets upward can enter the track 35'.

After application of caps 30', the intermittantly operating endless chain 20 then moves the link members 31 to a final station at which the movement of the endless conveyor 20 ceases, and fingers 46 move downwardly to engage the cam followers 29 on the link members 21 to straighten out the link members 21 to their original linear position. In so doing, the cage wires 10 overcome the springs 24, and the latches 26 are released, and at the same time, fingers 46 engage the cam followers 29 on the link members 21 and straighten them out. At this station, lifters 47 on each side raise the cage wire assembly 50 from the link members 21; air cylinders, 51, 52 engage the cap 30, 30' at the opposite ends of the cage wire assembly 50 and they press the caps 30, 30', whereby both caps 30, 30' are seated to a predetermined distance on the cage wires 10. It is at this point the final application of the caps 30, 31' has occurred. The lifters 47 descend, restoring the cage wire assembly 50 to rest on the link members 21 and the intermittantly moving endless chains 20 resume their motion to a discharge point, where a pair of tracks 53 receive the cage wire assembly 50 as the tracks 53 move on a downward course to return the link members 21 back to a starting point and to repeat the cycle.

The link members 21 consist of four metal blocks 54. Each block 54 has a generally vertically disposed channel 55 defining a bifurcated end slot. The opposite end of the link 21 is provided with a narrow enlargement 56 dimensioned to fit into the bifurcated end channel 55 of the adjacent link. A pivot pin 57 passes through the bifurcated end channel 55 and through the enlargement 56 whereby the four link members 21 are pivotably attached together. In the enlargement 56 at one end, a slot 58 is cut. The pivot pin 57' in the opposite end link is inserted in the bifurcated end 55 of the link at the other end. Thus, when the link members are folded, the pivot pin 57' and the slot 58 engage together. As already noted, each of the link members 21 has an indentation or seat 22 to receive a cage wire. As already noted, a latch 23 comprising an arcuate member which is spring loaded, normally engages a cage wire 10 on the seat 22. The latch is deflectable, to release the cage wire. One of the link members 21, between the end link members 21, is provided with an enlargement 59 at the bottom attached to the pivot pin 60 by means of which the four link members 21 constituting the assembly for holding four cage wires 10 is connected to the endless chain 20. When the link members 21 are folded so that the first link member is folded to engage with the fourth link member by means of the pin 57' seated in the slot 58, the four link members are held in this position by reason of a pivotably mounted spring-loaded plate 61, provided with a lip 62. The cam followers 29 (needle bearings) in being raised, thrust aside the lip 62 by overcoming the spring which holds the plate in normal position. See FIGS. 20, 21. Once above the lip, the plate 61 returns to normal position and the lip 62 now supports the link members 21 in continuously folded position. The fingers 28 disengage the cam-followers 29. When the link members 21 move past the plate 61, they are supported by the track 63 fingers 28 which engage the cam followers 29 on the link members 21 while the caps 30', 30 are being applied to the ends of the cage wires 10. After the caps 30', 30 are attached to the ends of the cage wires 10, there is no longer any need for the link members 21 to be held in that position. The pair of continuous endless conveyor chains 20 have mounting block enlargements attached to them and it is to these mounting blocks that the link assembly is attached, so that the links move with the intermittent motion of the conveyor chains 20. The cam followers 29 on each of the first and the fourth link members 21 constitute the means by which the fingers 28, in the first instance, fold the link members 21 and in the second instance, the fingers 46 unfold the links.

A main drive shaft 70 transverses the apparatus from one end to another, being driven by a motor 71. The main drive shaft is connected with a chain 72 which drives a right angle drive 73. This right angle drive 73 drives a crank 74 which causes the shuttle 18 to move back under the stack feeder 17 and then forward, carrying four cage wires 10. When the shuttle carrying four cage wires reaches its maximum horizontal movement, the shuttle 18 reaches a stop 76 where it dwells before its downward course. A cam 75 on the main drive shaft 70 causes the entire assembly to descend in between the endless chains 20 which carry the link members 21. The shuttle 18 assembly is narrower than the distance between the endless chains 20, and in moving down between the chains 20, ends 14 of the cage wires 10 encounter the link members 21. The cage wires 10 are transferred to the seats 22 in the link members 21. This cam 75 then returns the shuttle 18 to its initial raised position, to start the cycle over again.

The main drive shaft 70 also operates a chain 77 which is connected to a right angle drive 78. This right angle drive 78 is connected to another chain 79 which in turn is connected to an indexer 80 which controls the intermittant sequential movents of the endless chains 20 to start and stop the link members 21 at the several stations previously referred to. Thus the indexer 80 stops the endless chains 20 when the link members 21 are at the first cap applying station (FIG. 12), when the link members 21 are at the second cap applying station, and finally when the link members 21 arrive at the release and discharge station. The indexer 80 has a plurality of segmented cams which operate the endless chains 20 in timed relation to the loading of the cage wires on the shuttle, the transfer of the wires from the shuttle to the link members, the pausing of the link members at the first cap applying station, the pausing of the link members at the second cap applying station, and the pausing of the link members at the discharge station.

There is yet another cam 81 on the main drive shaft which causes the fingers 28 (chain wrap) which fold the links 21 to engage the cam followers 29 on the link members 21 to fold (wrap) the links so that the cage wires 10 are positioned precisely to receive the end caps 30', 30. There is a further cam 82 on the main drive 70 which operates in timed relationship to the shuttle 18 to open the latches 23 on the link members 21 so that the shuttle 18 may deposit cage wires 10 on each of the link members 21 unobstructed by the latches 23. After the shuttle 18 has performed this function and the cage wires 10 are in the seats 22 on the link members 21, this cam 82 disengages from the latches 23 and the latches springs 24 are no longer overcome, so the latches 23 hold the cage wires 10 on the seats 22. The indexer drive shaft 83 also operates a pair of gears 84, 85. These gears 84, 85 drive a chain 86, 87 which rotates the cap turrets 38 intermittantly in timed relation to the arrival of the cage wires 10 at the first capping station, and later at the second capping station. Likewise, the cap turrets 38 are operated in timed relation to the barrel cam 41 which orients the caps 30', 30 into proper position to receive the ends of the cage wires 10. On shaft 70 a cam 101 drives the barrel cam 41 intermittantly to operate the twister 43. On the same shaft 70, the second barrel cam 41 is operated intermittantly to orient caps 30' in the second turret 38 by the second cam 102. On the main drive shaft 70 there also are cams for each of the cap applicators 45 which must be operated in timed relation to the arrival of the caps 30', 30 in the cap turrets for application to the ends of the cage wires 10. When a cap in the cap turret 38 arrives at the application station, this cam 89 actuates a lever 90 which drives a cap applicator 45 to propel the cap 30 from the cap turret 38 and press it on to the cage wires 10. A second cam 94 propels the cap 30' from the second cap turret 38. When both ends of the cage wires 10 have been capped, the link members 21 are straightened from folded position to linear position (chain unwrap) by a cam 91 on the main drive shaft 70 which raises a table upon which a pair of fingers 92 are mounted to receive the cam followers 29 when the links 21 are straightened out. A pair of top fingers 46, are similarly driven downwardly to engage the cam followers 29 on the link members 21 which link members 21 thereupon are moved apart to rest on the first set of fingers 92. These top fingers 46 lower in coordinated relation to the bottom support fingers 92. The cam 91 then reverses the top fingers 46 and raises them away from the cam followers 29 on the link members 21. The endless chain 20 is once more operated by the indexer 80 and moves the link members 21 toward the discharge station. The upper fingers 46 are actuated by a separate cam 93 on the main drive shaft 70. As the upper fingers 46, restore the link members to normal linear disposition, a cam 94 on the main drive 70 operates levers 95 to move a pair of lifters 47 (see FIG. 17) underneath the end caps 30', 30 and raise them from the links 21. These lifters 47 are also operated by the first cam 91 which functions to support the link members 21 before the fingers straighten out the link members into linear position. A cam programmer 96 driven from the main drive shaft 70 then operates the pneumatic cylinders 51, 52 which engage the end caps 30', 30 to drive the cage wires 10 into ultimate predetermined seating engagement in the cage wire sockets 31 in the end caps 30, 30'. The cam programmer 96 also overrides the demand of the lamp 15 and the electric eye 16 so as to avoid overloading the set of cage wires leaving two lines of space. The cam programmer 96 also overrides any switch cutting off power to the motor 71 and continues that power until any cycle is complete, in order to prevent the apparatus stopping in the middle of a cycle.

The air cylinders 51, 52 then disengage from the end cap 30', 30 and the lifters 47 lower the cage wire assembly to the link members 21. The indexer 80 then operates the endless chains 20 to carry the cage wire assembly 50 to a pair of rails 53 upon which the cage wire assembly 50 lands and rolls off the discharge chute 97. In this manner, paint roller cages are rapdily and automatically assembled without manual intervention.

We claim:
1. A cage-assembly apparatus comprising:
   a. a delivery means for depositing random groups of cage wires on a cage wire feeder means,
   b. a wire feeder means for feeding cage wires to a cage wire stack feeder,
   c. a cage wire stack feeder means for delivering cage wires to a cage wire holder,
   d. a pair of cage wire holder means for holding wires in predetermined, spaced relation to each other,
   e. a pair of endless conveyor means,
   f. a plurality of pairs of pivotably interconnected link means arranged in pairs opposite each other on the conveyor means,
   g. one of each of the pair of the link means attached to the endless conveyor means,
   h. cage wire seats on each of the link means,
   i. means to move the pairs of cage wire holder means past each pair of link means to deposit cage wires on each of the seats on the link means,
   j. latches on each of the link means for capturing a cage wire on a seat, k. means to actuate the latches to capture the cage wires at both ends on each pair of link means,
l. means to shift the pairs of link means to dispose cage wires on the seats in position to receive caps at both ends,
m. means to drive the pairs of endless conveyors,
n. means to hold the link means in shifted position during movement of the conveyor means,
o. first means to deliver a cap with cage wire holes in registration with one end of the cage wires on the link means,
p. first means to apply the cap to one end of cage wires on the link means,
q. second means to deliver a cap with cage wires holes in registration with the other end of the cage wires on the link means,
r. second means to apply the cap to the other end of the cage wires on the link means.
s. means to return the pairs of link means to their original position before being shifted,
t. means to unlatch the latches,
u. means to discharge the cage wire assembly from the pairs of link means.

2. A method of assembling paint roller cages comprising,
a. connecting a group of link members together pivotably,
b. disposing the group of link members linearly,
c. depositing a cage wire on each of the link members,
d. holding each cage wire to the respective link members,
e. pivoting the link members to engage the end link member of the group with the opposite end link member of the group, whereby the cage wires are pre-positioned to enter sockets in end caps.

3. A method of assembling paint roller cages comprising,
a. the method according to claim 2 and,
b. delivering end caps to an end cap pocket on a rotatable turret at a receiving station,
c. rotating the turret to an end cap positioning station,
d. twisting the end cap on the turret at the cap positioning station, in one direction,
e. reverse twisting the end cap on the turret at the cap positioning station in the opposite direction to a position where it will be in registration with a cluster of cage wires, when the turret is rotated to the cap applying station,
f. rotating the turret to a cap applying station,
g. pushing the end cap out of the cap receiving pocket in the turret into engagement with the pre-positioned cage wire.

4. A method of assembling paint roller cages in which end caps are oriented to receive cage wires in sockets on the end caps comprising,
a. delivering end caps to end cap pockets on a rotatable turret at a receiving station,
b. rotating the turret to an end cap positioning station,
c. twisting the end cap on the turret at the cap positioning station in one direction,
d. reverse twisting the end cap in the turret at the cap positioning station in the opposite direction to a position where it will be in registration with a cluster of cage wires when the turret is rotated to the cap applying station,
e. rotating the turret to the cap applying station,
f. pushing the end cap out of the cap receiving pocket in the turret into engagement with the pre-positioned cage wire.

5. A cage assembly apparatus comprising:
a. a pair of conveyors operably mounted in parallelism with each other,
b. a pair of groups of pivotably associated links mounted on the conveyors,
c. means to intermittently drive the conveyors,
d. the links in each group normally disposed in line with each other,
e. the links in each group pivotable to dispose the end links in each group in engagement with each other,
f. a cage wire seat on each link of each pair, and defining means to hold a plurality of cage wires on each group of links in general parallelism with each other,
g. cage wire latches pivotably mounted on each of the links,
h. means to pivot the cage wire latches to hold cage wires on the seats when the normally linearly disposed links pivot to dispose the end links into engagement with each other,
i. means to pivot the links to dispose the end links of each group of links into engagement with each other, whereby cage wires on the seats are positioned to receive end caps, and
j. first means to deliver a first end cap with cage wire holes in registration with one end of the cage wires on the links,
k. means to apply the first end cap to one end of the cage wires on the links.

6. A cage wire assembly apparatus comprising:
a. the apparatus according to claim 5,
b. second means to deliver a second end cap with cage wire holes in registration with the other end of the cage wires on the links, and
c. means to apply the second end cap to the other end of the cage wires on the links.

7. A cage assembly apparatus comprising:
a. the apparatus according to claim 5,
b. the first means to deliver a first end cap with cage wire holes in the cap in registration with one end of the cage wires on the links comprising:
 A. a rotatable turret,
 B. a plurality of end cap pockets in the turret,
 C. a means to rotate the turret in timed relation to the movement of links at a cap receiving station, from a cap receiving station, to a cap orientation station, to a cap applying station.
 D. means to hold a cap releasably in the pockets,
 E. means to deposit an end cap in each of the pockets.

8. A cage assembly apparatus comprising:
a. the apparatus according to claim 5,
b. means to deposit a cage wire on each of the seats.

9. A cage assembly apparatus comprising:
a. the apparatus according to claim 7,
b. a cap twister,
c. a plurality of prongs on the cap twister,
d. a barrel cam,
e. a cam follower on the cap twister engageably with the barrel cam,
f. means to operate the barrel cam to engage the twister with an end cap in the turret and to twist the cap in one direction, and then to twist the cap in the opposite direction to a position wherein cage wire sockets in the cap will end up in precise registration with cage wires on the links at the cap applying station.

10. A cage assembly apparatus comprising:
a. the apparatus according to claim 7,
b. means to drive the end cap out of the turret so that the ends of the cage wires enter the cage wire sockets in the end cap.

* * * * *